Jan. 18, 1927. 1,615,024
C. R. MABEE
MANUFACTURE OF LIVE STOCK FEEDS
Filed Jan. 14, 1921
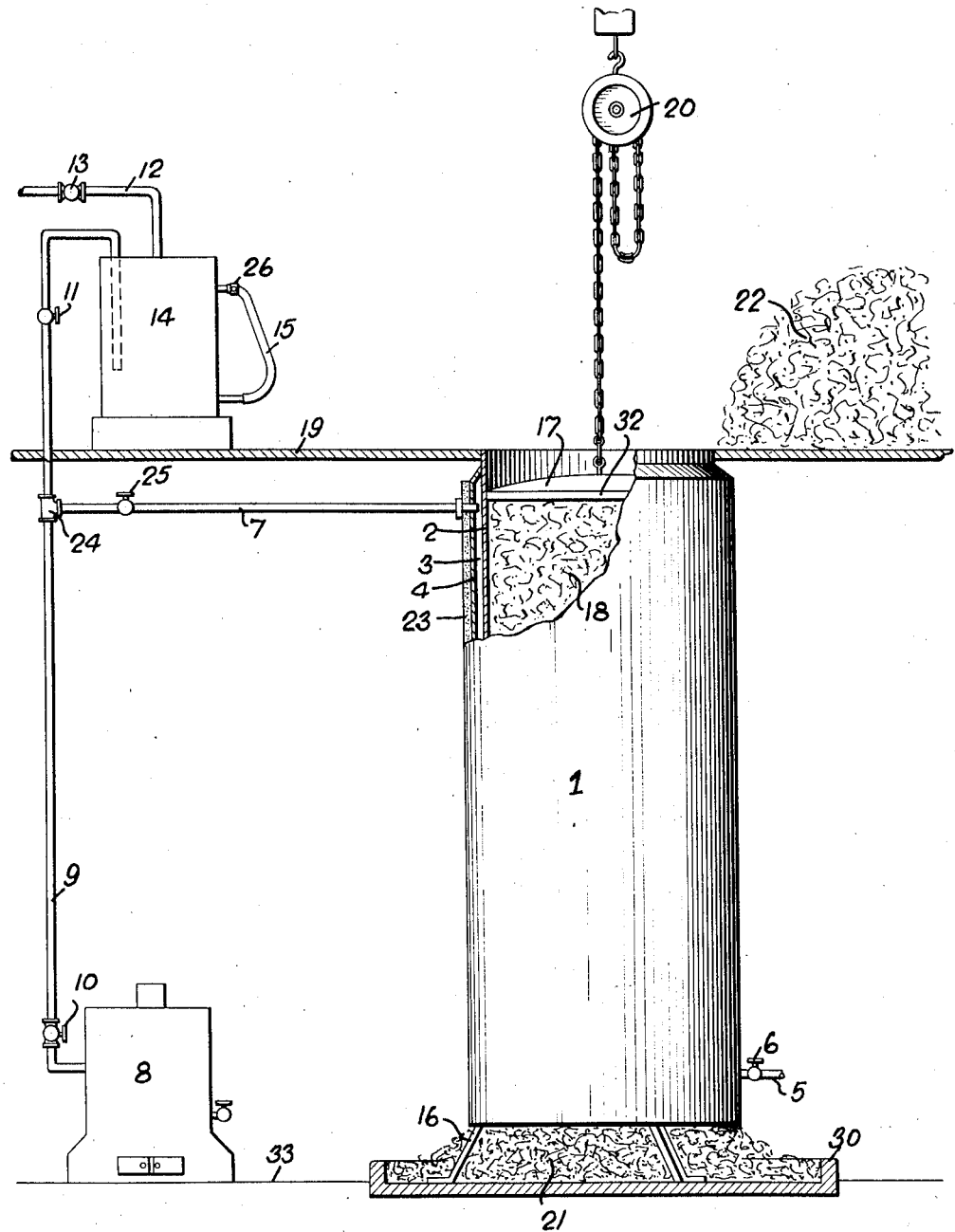
INVENTOR.
Charles R. Mabee.
BY Mayer, Warfield & Watson
ATTORNEYS.

Patented Jan. 18, 1927.

1,615,024

UNITED STATES PATENT OFFICE.

CHARLES R. MABEE, OF BUFFALO, NEW YORK, ASSIGNOR TO MABEE PATENTS CORPORATION, OF DOVER, DELAWARE, A CORPORATION OF DELAWARE.

MANUFACTURE OF LIVESTOCK FEEDS.

Application filed January 14, 1921. Serial No. 437,308.

This invention relates to the manufacture of feeding materials, particularly such materials as are suitable for use in live stock feeding.

An object of the invention is to provide a process which is easily operated, consumes little time and is economical.

Another object of the invention is to provide a process for the treatment of dry vegetable materials such as farm roughage, for example, hay, various kinds of fodder, stover, etc., whereby such material is rendered more palatable, has an improved flavor and an enhanced feeding value.

Other objects of the invention will be in part obvious and will in part appear hereinafter.

I have found that when comminuted farm roughage, that is hay, various kinds of fodders, straw, etc., either alone or combined with cereal materials is subjected in the presence of moisture in an amount sufficient to thoroughly dampen such material at a temperature slightly above ordinary temperatures and in a compressed condition to the action of a ferment, which may be such ferment or ferments as are inherently present in the material and/or ferments present in or produced from other materials such as, for example, malt diastase and yeast, live stock feeding materials are produced in a form or condition in which they are readily assimilated. Further, these materials are adapted for use either alone or in combination with other feeding materials such as grains, oil meals, etc.

When the usual farm roughage is comminuted or shredded, a cubic foot in a non-compressed condition will weigh from about two to six pounds. Accordingly, when in this condition, they require for retention a relatively larger container than would be required should the comminuted material be subjected to pressure, for example, a pressure sufficient to compress from 10 to 20 pounds into one cubic foot of space.

By compressing the roughage as by the application of pressure or simply by packing into a container, the volume of space required for the materials is reduced to about one-fourth of that which would be required were no pressure exerted; the amount of heat required to maintain a given temperature, radiation being considered, is reduced by about 70%; the amount of moisture required to maintain a given degree of humidity is reduced by approximately 75%, and a more rapid fermentation ensues in that the ferment and the materials are brought into more intimate contact.

The comminuted vegetable material or roughage may be compressed into a suitable container by any convenient method and may be combined or impregnated with a ferment or ferments introduced while in either a dry or in a liquid state or suspended in air, and the impregnation may take place either before, after or during the period at which the material is undergoing treatment under the influence of heat, moisture and pressure. The fermentative activity may be accelerated by an addition to the comminuted roughage of auxiliary or readily fermentable nutrients, as rye, barley, corn, middlings and leguminous vegetation, which may be in a partially fermented and preferably finely ground condition.

When treating dry vegetable material containing large amounts of fibre, it may be found advantageous to subject the materials to a preliminary treatment in the presence of water, sufficient to have the material well wetted at a temperature above the boiling point of water, as by means of steam, and thereafter suitably reducing the temperature. By means of this treatment the fibrous material is opened up or rendered more porous and hence more readily accessible for action thereon by the ferment. This preliminary step, while desirable in some instances, is not a necessary preparatory step, for the process may be carried out at any temperature and terminated after the material has been subjected for a suitable period to the action of a ferment under the influence of heat in the presence of moisture and while under continuous or intermittent pressure or compressed in a container by other suitable means.

For a fuller understanding of the nature and objects of the invention, reference should be had to the following detailed description taken in connection with the accompanying drawing in which is shown a longitudinal section, partly broken away, of an apparatus suitable for the practice of my invention.

This apparatus comprises in combination a container 1 which is substantially open at both ends and mounted upon a support 16.

The wall 2 of the container is surrounded by an annular space 3 serving as a jacket, the outer wall 4 of which is covered with an insulating material 23. The upper portion of the container lies in a plane substantially that of a mow floor 19, and the lower portion rests upon a feeding floor 33.

A means for increasing the temperature of a liquid, as a hot water heater 8, is connected by a pipe 9 with a reservoir 14, which reservoir may be supported by a mow floor. The pipe 9 is provided with regulating valves 10 and 11, and between these valves at 24 is a pipe 7, provided with a regulating valve 25. The outer extremity of this pipe is connected with the annular space. An outlet pipe 5 is provided in the lower outer wall, said pipe having a regulating valve 6 for controlling the flow of a heating medium, which may be introduced into the annular space. Positioned above the reservoir is a pipe 12 having a valve 13 and connected with a suitable water supply. A hose 15 is connected at the lower portion of the reservoir, the upper end being loosely held by a clamp 26.

Positioned above the upper end of the container is a hoist 20, for moving a cover weight 17 vertically within the container and adjacent to the walls thereof. The cover weight when lowered acts in a manner to substantially close the upper end of the container and it may be of any material, but it has been found to be advantageous to have that part 32 which rests upon the vegetable material, composed of a material which does not readily transfer heat. Wood is a satisfactory insulating material to attach to a casting or steel plate in the fabrication of the cover weight. Weights weighing from 10 pounds per square foot to 120 pounds per square foot have been used. It has been observed that when the materials are moist and heated they enter into a very compact form which enables them to retain heat, and further that heat is generated in the materials much faster with a heavy cover weight than with a light one. An elevation 30 attached to the feeding floor prevents liquid materials from flowing over the floor and it may be of circular form about the lower end of the container.

In the practice of the invention vegetable material, such as comminuted dry roughage, may be introduced into the upper portion of the container, and moisture in the form of steam or water, and in an amount sufficient thoroughly to dampen the material without submerging the same is introduced thereupon, preferably as a spray of water or a spray of water impregnated with a ferment, such as yeast, diastase, or partially fermented and finely ground vegetable materials, and particularly rye, barley, ground or fermented leguminous vegetation. The water or water impregnated with a ferment may be introduced from the reservoir 14 by means of a pipe 15 in a heated or unheated condition, and, if heated, at such a temperature as would not inhibit the desired fermentative action. The materials introduced and moistened may then be compressed or packed as by means of a weight 32 and allowed to remain a suitable period of time until the materials have been partially predigested and have a decided aromatic odor.

Moisture in the form of heated or unheated water may be used to treat the roughage either before, during or after it is introduced into the container, and the ferment, which may be diastase, used in the form of malt, may be combined in dry form with the roughage before or after its introduction in the container, or while the container is being filled.

Further, the method may be carried out in a manner which may be termed a "semicontinuous process", that is, the dry roughage to be treated is handled progressively. As the treated roughage is removed from the container by any desired means, sufficient additional material is introduced into the container and properly moistened and treated so that at all times the process continues with the container substantially filled with the vegetable material. This mode of operation effects expediency and efficiency in the production of the feed stocks.

The process may also be conducted by what may be called a "batch procedure", that is, the container, entirely empty, is completely filled with the vegetable material at a given operation. When the vegetable material is sufficiently treated, it is removed in its entirety, the container then being refilled and the operation repeated.

In farm practice, where the period of treatment is not essentially an important factor and where the feeding materials are utilized, it may be said at the point of manufacture, the process may be carried out successfully by a slow treatment and without subjecting the materials to a temperature much greater than atmospheric temperatures. By practicing this slow process, which entails the lengthening of the treatment at a temperature materially below the boiling point of water, there is obtained substantially the same results as are obtained by higher temperatures used for a relatively shorter time. In the slow process as well as in the process hereinbefore referred to, the inherent ferments although it is not necessary, may have their action augmented by the use of auxiliary ferments, such as those which have previously been mentioned, by admixing such auxiliary ferments with the dry comminuted roughage prior to, at the time of, or after its introduction into the container. It will, of course, be understood that the activity and vitality of the ferment is not to be inhibited by the use of too high temperatures.

This fermentative treatment which may be applied as continuous, semi-continuous, batch and quick or slow process, through the action of a ferment as diastase, yeast, etc., promotes the development of enzymes when commingled with the materials which are to be utilized for feeding purposes. The starch and perhaps a part of the cellulose present in the materials undergoing treatment may be under suitable temperature conditions, in whole or in part, converted into less complex carbohydrates of a sugary character. The value of the feeding materials is enhanced by the addition of these digestive agents, and the enzymes produced thereby.

As an incidental advantage of the process, due to the use of materially less water or moisture than would be required should the comminuted material be treated without compression, the necessity of removing the excess water from the mass as by evaporation is avoided. The soluble ingredients are released from the container in conjunction with the insoluble material in a comparatively dry state without loss of nutrient value.

Where a batch method of processing is employed, the mass may be dried within the container or allowed to escape therefrom in a relatively moist condition.

It has been pointed out that the roughage contains inherent ferments which in themselves will produce desirable chemical changes without the aid of extraneous ferments, and it will, of course, be understood therefore that the invention is not confined to a combining of extraneous ferments with the material undergoing treatment, particularly in such case where the materials are compressed and treated in a slightly heated and moistened condition.

The fermentative activity as set forth hereinbefore is, as it will be realized, of a type which is not attended by acid formation, and hence the term "non-acidifying" as used in the claims specifies fermentation of the type wherein acids are produced, if at all, only incidentally, and to such a limited extent as not to impart acidic characteristics to the finished product.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. The method of transforming farm roughage into a readily assimilable and nutritious live-stock feed which comprises admixing with the roughage an enzymotic fermentative agent capable of converting substances therein, and subjecting the roughage, in the presence of moisture, to non-acidifying fermentative activity.

2. The method of transforming farm roughage into a readily assimilable and nutritious live-stock feed which comprises admixing with the roughage a fermentative agent containing diastase, and subjecting the roughage, in the presence of moisture, to non-acidifying fermentative activity.

3. The method of transforming farm roughage into a readily assimilable and nutritious live-stock feed which comprises moistening dry comminuted farm roughage with a malt infusion and packing the roughage in a container, and thereafter subjecting the roughage to non-acidifying fermentative activity until the substances therein have been partially predigested and have an aromatic odor.

4. The method of transforming farm roughage into a readily assimilable and nutritious live-stock feed which comprises admixing with the roughage a fermentative agent containing diastase, and subjecting the roughage, in the presence of moisture, to non-acidifying fermentative activity at an elevated temperature.

5. The method of transforming farm roughage into a readily assimilable and nutritious live-stock feed which comprises admixing with the roughage a fermentative agent containing diastase, applying pressure to the roughage, and subjecting the roughage, in the presence of moisture, to non-acidifying fermentative activity.

6. The method of transforming farm roughage into a readily assimilable and nutritious live-stock feed which comprises admixing with the roughage a fermentative agent containing diastase, applying to the roughage a pressure sufficient to reduce the volume thereof about 80%, and subjecting the roughage, in the presence of moisture, to non-acidifying fermentative activity.

7. A method for the production of live-stock feed which comprises moistening dry farm roughage with an infusion of diastase, and subjecting the roughage, while packed in a container, to non-acidifying fermentative activity until the conversion of the roughage has caused a change in flavor.

8. A method for producing a live-stock feed which comprises admixing with the roughage a material containing diastase, and moistening the roughage, applying heat and pressure thereto, and subjecting the roughage to non-acidifying fermentative activity until the substances therein have been partially predigested and have a decided aromatic odor.

CHARLES R. MABEE.